(No Model.)
T. O. JONES.
APPARATUS FOR CLEANING BOOTS AND SHOES.
No. 338,157. Patented Mar. 16, 1886.
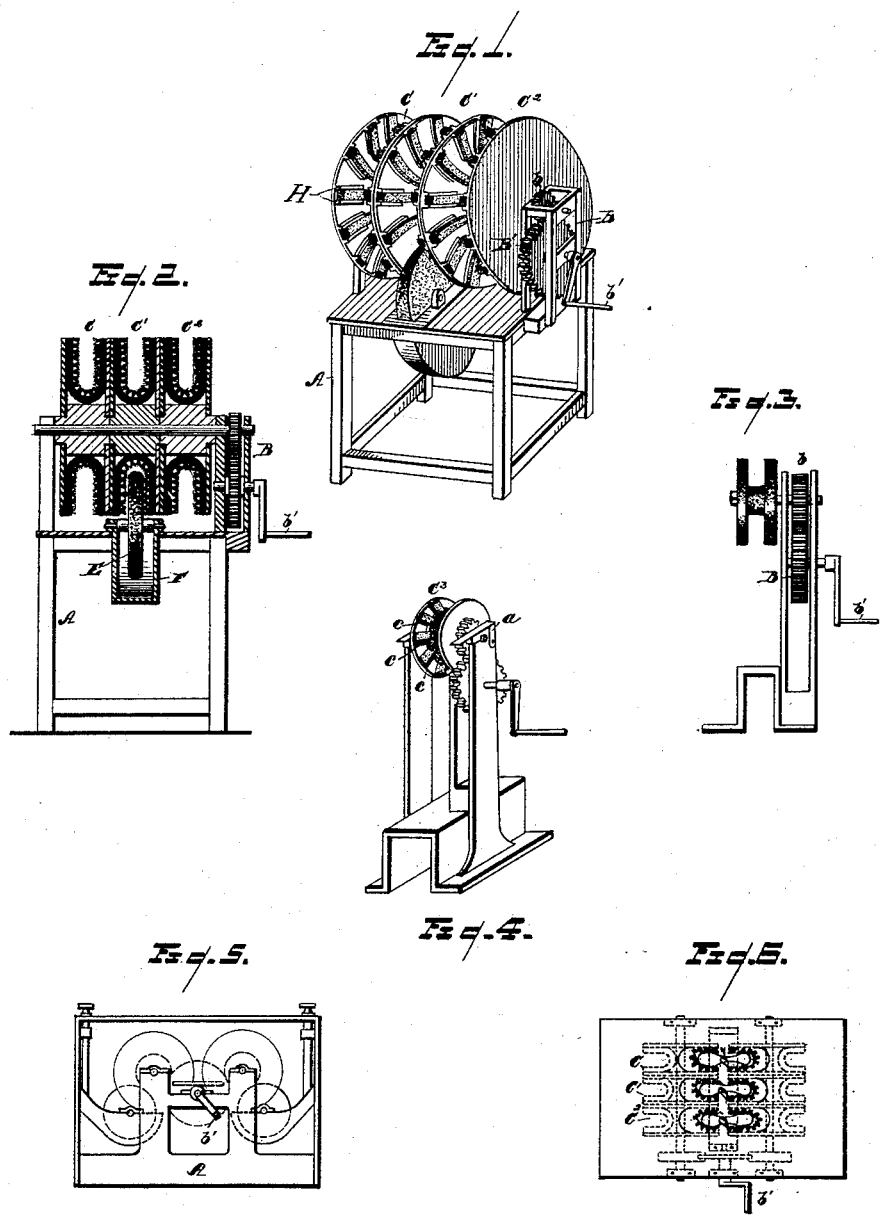

UNITED STATES PATENT OFFICE.

THOMAS O. JONES, OF 1 WELFORD TERRACE, BROOKE ROAD, UPPER CLAPTON, COUNTY OF MIDDLESEX, ENGLAND.

APPARATUS FOR CLEANING BOOTS AND SHOES.

SPECIFICATION forming part of Letters Patent No. 338,157, dated March 16, 1886.

Application filed June 11, 1885. Serial No. 168,380. (No model.) Patented in England November 21, 1883, No. 5,478.

*To all whom it may concern:*

Be it known that I, THOMAS O. JONES, of 1 Welford Terrace, Brooke Road, Upper Clapton, in the county of Middlesex, England, have invented a new and useful Improvement in Apparatus for Cleaning Boots and Shoes, (for which I have obtained a patent in Great Britain, No. 5,478, November 21, 1883;) and I declare the following to be a full, clear, and exact description of the same, such as will enable others skilled in the art to which it pertains to make and use it, reference being had to the accompanying drawings, which form a part of this specification.

My invention relates to apparatus for cleaning and blacking boots and shoes; and it consists of the combination of devices and appliances hereinafter specified, and more particularly pointed out in the claims.

In the drawings, Figure 1 is a perspective view embodying my invention. Fig. 2 is a vertical cross-section. Figs. 3 and 4 illustrate ways of supporting the spindle and making it removable. Fig. 5 is an end view of a modification. Fig. 6 is a plan view of the same.

I carry out my invention as follows:

A represents any suitable frame.

B is a spindle or arbor supported in any desired manner upon said frame. It may have bearings at both ends or at one end only. I prefer to make said spindle removable. For this purpose the upper bearings, $a$, may be hinged at one end, as shown in Fig. 4. The spindle is provided with a pinion, $b$, meshing with a drive-gear, B', which may be operated by a crank, $b'$, or by any other power.

C C' C² designate a series of brushes carried by disks connected with the spindle B, so as to rotate with it, and are arranged radially upon said disks, as seen in Fig. 1. I prefer to mount upon the spindle B a series of hubs, as seen in Fig. 2, to which the disks carrying the brushes may be secured; but the disks may be secured directly to the spindle B, if desired. The inner faces of these disks are provided with a series of short projecting walls or flanges, H, running from the periphery toward but not quite to the center thereof, and forming channels within which the brushes are inserted and held, as seen in Fig. 1. These walls should be so arranged that the width of the channels should be about equal to that of the brushes, so that the latter will fit snugly therein and be held in place by frictional contact. It is obvious that instead of projecting walls being employed the disks themselves may be grooved to form the channels. For the purpose of more securely holding the brushes in place, a tire, $c$, may be passed circumferentially around the disks, as seen in Fig. 4. I prefer to construct the brushes of U shape, as seen in Fig. 2; but plain brushes may be employed, if desired. There may be a single U-shaped brush, as in Figs. 3 and 4, or there may be one for cleaning, C, another for blacking, C', and another for polishing, C², said several brushes being of various qualities and constructions to suit their different purposes. So, also, the spindle might be still more extended and several sets of brushes be located thereon for operating on any desired number of boots or shoes. Moreover, instead of employing a single spindle, two may be employed, as shown in Figs. 5 and 6, each provided with a pinion meshing with the drive-gear and carrying sets of rotary brushes, with foot-rests D D' D² between them, so that the brushes will operate upon different portions of the boot or shoe simultaneously, the foot being changed from one foot-rest to another for the different operations of cleaning, blacking, and polishing.

E represents a rotary blacking-distributing brush, journaled in the frame and revolving by frictional contact with the adjacent brush C'. This brush E revolves in a receptacle, F, which is supplied with liquid blacking. The brushes, being made removable, may be easily repaired. The frame may be fitted up to constitute a cabinet. The U-shaped brushes are preferably arranged in a series upon an annular disk or wheel.

What I claim is—

1. The combination, with a frame and a rotary spindle, of a series of disks carried by said spindle and provided with a series of brushes radially mounted therein, substantially as described.

2. The combination, with a frame and a rotary spindle, of brushes constructed of a series of U-shaped sections removably engaged upon a disk, substantially as described.

3. The combination, with a frame and a rotary spindle, of disks carried by said spindle, provided with a series of projecting walls, forming channels for the reception of the brushes, substantially as described.

4. The combination, with a frame and a rotary spindle, of disks carried by said spindle, provided with a series of channels within which the brushes are inserted, and a securing-tire passed circumferentially around said disks, substantially as described.

5. The combination, with a frame, a rotary spindle, and disks mounted upon said spindle, carrying the brushes, of a rotary distributing-brush located underneath said spindle and between the disks carrying the brushes, substantially as described.

6. The combination, with a frame, of a rotary actuated spindle provided with a series of brushes, and a distributing-brush rotatable by frictional contact with one of the brushes engaged upon said spindle, said distributing-brush provided with a receptacle in which it is rotatable, substantially as described.

In testimony whereof I sign this specification in the presence of two witnesses.

THOMAS O. JONES.

Witnesses:
W. THOS. MARSHALL,
2 *Pope's Head Alley, Cornhill, London, Gentn.*
JAMES O. THORN,
*York Grove, Peckham.*